United States Patent [19]

Toncelli

[11] Patent Number: 5,264,168
[45] Date of Patent: Nov. 23, 1993

[54] PLATE PRODUCT OF CERAMIC MATERIAL AND PROCESS FOR THE MANUFACTURING THEREOF

[76] Inventor: Marcello Toncelli, Via Papa Giovanni XXIII, 2 - 36061 Bassano del Grappa (Vicenza), Italy

[21] Appl. No.: 841,254

[22] Filed: Feb. 24, 1992

Related U.S. Application Data

[63] Continuation of Ser. No. 463,136, Jan. 10, 1990, abandoned.

[30] Foreign Application Priority Data

Jan. 13, 1989 [IT] Italy ................ 85505 A/89

[51] Int. Cl.$^5$ ................ C04B 41/60
[52] U.S. Cl. ................ 264/63; 264/71; 264/101; 264/102
[58] Field of Search ................ 264/63, 71, 101, 102

[56] References Cited

U.S. PATENT DOCUMENTS

| | | | |
|---|---|---|---|
| 1,768,546 | 7/1930 | Curtis | 264/71 |
| 4,204,820 | 5/1980 | Toncelli | 425/89 |
| 4,698,010 | 10/1987 | Toncelli | 264/71 |

FOREIGN PATENT DOCUMENTS

| | | | |
|---|---|---|---|
| 615429 | 2/1961 | Canada | 264/63 |
| 1671244 | 7/1975 | Fed. Rep. of Germany | |
| 3314794 | 10/1984 | Fed. Rep. of Germany | |
| 2387749 | 3/1978 | France | |

OTHER PUBLICATIONS

Soviet Inventions Illustrated, Week 23, L02, Abstract No. 87-161830/23, Jun. 17, 1980; and SU-A-1265176 (Tomsk. Poly.), Oct. 23, 1986.

*Primary Examiner*—James Derrington
*Attorney, Agent, or Firm*—McAulay Fisher Nissen Goldberg & Kiel

[57] ABSTRACT

Plates of ceramic material are prepared starting from stone material, particularly feldspar, quartz, porphyry, granites, silica, syenites, nephelines, ceramic materials, clays, kaolins, bentonites, in granular and/or powder form, mixed with a small amount of ceramic binder to form a mixture. This mixture is distributed onto a plane delimited from a containing frame and then subjected to the simultaneous action of a vacuum and of a vibratory motion combined with a pressing action. After the moulding step, a drying step and then a firing step are carried out, the latter taking place at the standard temperatures for the manufacturing of ceramic products.

The resulting plate has high mechanical properties, is highly resistant to atmospherical and chemical agents, and has a very valuable aesthetic appearance.

18 Claims, No Drawings

PLATE PRODUCT OF CERAMIC MATERIAL AND PROCESS FOR THE MANUFACTURING THEREOF

This application is a continuation of application Ser. No. 07/463,136, filed Jan. 10, 1990, now abandoned.

The present invention relates to the manufacturing of ceramic material in plate form, particularly of great size, starting from natural stone material, as well as to the related manufacturing process.

In the field of the building materials, particularly for flooring and external or even internal facing of walls and buildings, there are known the ceramic material and the plate like agglomerates, apart obviously from the material of natural origin, such as the stone plates (marbles, granites, travertines, etc.).

The last type in the course of the centuries has been mostly substituted for by alternative materials, since it is a very expensive material, especially when it is a valuable stone, with low yields and difficult availability.

The ceramic materials are available in form of tiles of very reduced size, normally not higher then 40×40 cm, which only in the case of particular materials, such as the so-called "brickwork", can be slightly greater, suffering however from some further drawbacks.

As a matter of fact, in the case of the standard ceramic material, the upper surface of which has a vitrified appearance, the absorption resistance and consequently the resistance to the chemical and atmospherical agents is excellent, whereas the mechanical resistant and the intact resistant can be poor. To those features a high aestetical value is to be added, even if whatever pattern reproduced onto the surface of the ceramic materials is devoid of "deepness" since the starting mixture is prepared from powders.

In turn the above mentioned "brickwork" obtained from a clay paste containing particularly salt additives, has additionally a relevant porosity which is eliminated or at last reduced by means of particular surface treatments carried out after the laying down, or making use of the so-called gresification.

Even the ceramic gres of high quality, which is better than the enameled ceramic as regards the mechanical behaviour, is normally manufactured in the size of 30×30 cm and in a reduced amount in the size of 40×40 cm.

In turn the agglomerates or conglomerates are manufactured in form of plates or blocks starting from inert stone materials, having a widely variable granule size, which are bonded by means of cement binders or by means of polymeric binders.

In the first case the molded plate is hardened essentially in same manner as a conventional cement item, with the long times which are consequently necessary, and then carried out finishing steps such as dressing, polishing and possibly size cutting, those being only the main steps. The agglomerates realized with polymeric binders on the contrary involve a polymerization or cross linking steps of the polymer forming the binder.

A process for the manufacturing of these aggregates is the subject of the two Italian Patents Nos. 1,056,388 and 1,117,346, which are herein incorporated for reference. Such a process, by adopting the simultaneous action of the vacuum and of the vibropressing, in the phase of product molding, has permitted the achieving of satisfactory results under the point of view not only of aesthetic and dimensional of the products (as a matter of fact plates of several meters of length imitating natural stone can be manufactured), but also under the point of view of the mechanical properties.

Of course these mechanical properties remain within the scope of those which are possible for an agglomerate of this type and from the aesthetic point of view the resulting products maintains a certain "flatness" or lack of deepness at the surfaces formed by the binding material. From the point of view of the industrial manufacturing, the process and apparatus disclosed in the aforesaid Italian Patents permitted the ratio between an inert component and binder to be reduced to a minimum and at the same time to relevantly increase the mechanical properties of the final product.

Coming now shortly back to the ceramic materials, it is worth to note that to date it has not been possible to manufacture in an industrially acceptable manner of products, namely tiles, of a size greater then the above mentioned one, since by applying the to date known processes for the ceramic materials in the molding phase enormous pressures would be necessary, which are fully not acceptable and not applicable in an industrial line; likewise insoluble problems would be raised, moreover, by the firing phase as a consequence of the relevant shrinkages especially in the horizontal direction and due to the diminution of volume from the green state to the fired state of the material. As a matter of fact, thus, the situation can now be summed up in the following terms:

1) By having recourse to the natural stones (granite, porphyry, etc.) the working yields are very low (it will be enough to consider that in the average marble quarry the yields as plates with respect to the dug material is normally of the order of 15-20%). In addition it is very difficult to obtain very great amounts of material which is uniform as to the aesthetic properties.

2) The recourse to the ceramic materials is limited to very small sizes, with the self-evident limitations in the use as vertical facings especially for external surfaces in the building industry, particularly in a building of relevant height.

3) The agglomerates manufactured starting from stone materials with cement or polymeric binders, although resolving the problems of length of the plates and of the aesthetic uniformity, are affected by intrinsic limitations under the point of view of the characteristics and properties both mechanical and of resistance to the atmospherical agents depending of the properties of binders used.

The purpose of the present invention is thus that of providing a product having the advantage of properties of the ceramic materials without the intrinsic limitations of the related present technology; otherwise stated the purpose of the present invention is that of providing a plate formed of materials of ceramic nature, having a great size and by means of an industrially acceptable and advantageous process by which also the exceedingly high diminution of the size in a cross direction of the plates is eliminated, as due to the volumetric variation in the firing phase. This purpose is achieved by means of a manufacturing process and consequently by means of the product resulting therefrom, the process being characterized by the following steps:

a) preparation of the ceramic mixture comprising a granulate having particles of maximum size consistant with the thickness of the final compacted plate, said granulate being obtained from natural stone materials, or from the granulation of ceramic materials, even prepared for this purpose, and a binding phase consisting of powders for ceramic materials moistened and mixed with an inorganic water based binder likewise the standard agents used in the technology of ceramic materials, the ratios between granulate and binding phase being of between 0.35 and 0.55 by volume, the maximum size of the granules being preferably less then ⅓ of the thickness of the compacted plate;

b) molding in form of a plate of the mixture thus prepared and distributed onto a molding support, by simultaneous application of a vibration action and of a pressing action onto the distributed mixture, the pressure being at least 0.5 kg/sq.cm., the mixture being subjected throughout the molding phase to a vacuum of at least 40 mbar of residual pressure;

c) drying of the molded product at a temperature lower than that of ceramic firing and for a time of at least two hours;

d) firing of the molded and dried product at a temperature of between 1000° C. and 1300° C. for the time necessary to obtain a plate of ceramic material having the properties characteristic of these materials.

Obviously the above definition corresponds to the most general embodiment of the present invention, and preferred embodiments are foreseen which shall be precised in the detailed description which follows. As already mentioned, in the first step of the process a ceramic mixture is prepared from a granulate and a binding phase.

The granulate is obtained from natural minerals, preferably feldspars, porphyry, granites, quartz materials, and is preferably subjected to a preliminary calcination, having the purpose of stabilizing the granulates, mainly by removing the moisture and impurities which it may naturally contain; such a stabilizing treatment effective as regards the reduction of the shrinkage of the final plates in the step of ceramic firing.

These materials can be even more effectively substituted for by granulates coming from the grinding of ceramic materials, for example porcelain masses or gresified materials of various compositions having natural and/or variously coloured, whereby aggregates are obtained which are dimensionally stabilized and devoid of impurities. The binding phase consists of powder material of the type conventionally used for the manufacturing of ceramic materials, mainly feldspars, nephelines, sientes, added with clays and/or kaolin and/or bentonites, in admixture with the other ingredients which are normally used for the preparation of the starting materials of the ceramic products, the mixture being such that in the firing step the volumetric shrinkage takes place mainly in a vertical direction with respect to the plate in order to render minimum the shrinkage in the horizontal direction. Also the powder material forming the binding phase, in the presence of impurities, may be previously calcinated in order to obtain stabile powders in the firing step.

To promote the intimate admixing of the binding phase with the granulate and give to the mixture a greater cohesion in the molding step and a sufficient flowability of the particles forming the mixture in the step of compactation by vibro-pressing under vacuum, the powdered material is preferably moistened with sodium silicate (also known as liquid glass).

The volume percent of binding phase with respect to the granulate is selected taking it into account that this phase must form a continuous matrix in the final ceramic product, in which matrix the particles of aggregate mineral remain anchored without being embedded therewithin. Preferably the percentage of binding phase is of between 45% and 65% by volume referred to the final composition, more preferably between 60% and 40%.

After the firing the granules form within the mass a continuous backbone by which the product is provided with a flexural strength higher than 300 kg./sq.cm.

In the case in which the binding phase consists of ceramic powder moistened with a liquid binder, such a moistening together with the admixing with the granulate takes place preferably but not necessarily within mixing apparatus operating under vacuum whereby the inclusion of air or other gas within the mixture mass is limited as much as possible. Of course this caution has it too, as the main purpose, that of reducing the shrinkages in the firing step, avoiding at the same time internal and/or surface porosity of the final product.

Turning now to the molding step, it comprises the distribution of the above said ceramic mixture onto a support which in the preferred embodiment consists of a mold, even if the operation can be carried out as well directly onto a conveying belt, without having recourse to a containing mold but merely to a movable containing frame, positioned onto the belt in the distribution and molding step.

Once the mixture has been distributed to a substantially uniform thickness of between 15 and 60 mm, in the environment surrounding the mold a vacuum of at least 40 mbar of residual pressure, preferably of between 28 and 18 mbar, is established.

The proper molding step consists in applying to the mixture distributed and contained within the mold or to the mixture distributed and contained onto the conveying belt a vibration motion, with a driving force of at least 1.5 kg/sq.cm, preferably 2 kg/sq.cm, with a vibration frequency of about 60 Hz, the mixture contained within the mold being simultanously subjected to a compacting pressure of at least 0.5 kg/sq.cm, preferably 1.1 kg/sq.cm.

The molding time is on the average of the order of 30–60 seconds, normally about 40 seconds.

Once the molding step has been completed, the room pressure is set again within the molding machine and the raw product thus molded is removed from the mold.

This raw product is then passed to the thermal treatment section, which treatment takes place in two different steps, namely the drying and the proper firing.

The drying is carried out in a proper oven and at a temperature lower than that of firing, with an average staying of some hours at a drying temperature of about 130° C.

After drying, the dried product is easily handled, does not show remarkable volume shrinkages and has a not negligible flexural strength of the order of 100 kg/sq.cm. The firing step is carried out in a second oven wherein the dried material remains for some hours at a temperature of 1000°–1300° C. However both the heating phase and the cooling phase at the end of the firing take place in a gradual manner.

The thus obtained product is in form of plates of great size, and can reach several linear metres, thanks to the fact that to the pressures and the other forces acting in the molding step have modest intensity and are consistent with a manufacturing on industrial scale.

Under the aesthetical point of view, the obtained plates have a surface appearance very similar to that of the natural stones from which the starting granulate has been obtained: more particularly the surface has a certain transparency owing to which the particles of the starting granulate retained within the binding ceramic matrix and intimately and irreversibly bonded thereto can be clearly distinguished. When the granules are formed by ceramic materials (porcellanes of several compositions, gres, etc.), prepared to this end with several colours and ground, aesthetical effects of exceptional chromatic and composition value are achieved.

Lastly, once the starting ceramic mixture and the process conditions have been set, there are no further limits to the amount of plates which can be manufactured with identical aesthetic and chromatic tonality properties, such a result being to date impossible using natural stone dug from a quarry.

The plates moreover have a high flexural strength, higher than 300 kg/sq.cm., show isotropy for the different mechanical properties (this feature being not shown by the natural stones), have high specific density and generally optimum mechanical properties which are definitely higher than those of the above mentioned agglomerates, even if manufactured starting from the same stone material forming the starting granulate.

The plates can be moreover polished in the same manner as natural stone and have high a resistance to the atmospherical and chemical agents, together with an almost null absorption and a high wear resistance.

Owing to these properties the ceramic plates manufactured by the process of the present invention are mainly useful for the external facing panels of buildings and in the flooring of surfaces undergoing an intense walking.

Some typical formulations of the starting mixture are hereinafter reported, in which only the solid ingredient are indicated, since the moistening agent is used in small amounts, such as to provide only a slight moistening of the granulate and of the ceramic powder, and having moreover the function of giving to the dried plate a mechanical strength sufficient to permit the handling thereof and the starting of the firing step (about 70-100 kg/sq.cm. of flexural strength).

| A) | Clay | 40% |
| | Feldspars | 60% |
| B) | Feldspars | 90% |
| | Bentonite | 2% |
| | Kaolin | 8% |
| C) | Kaolin | 5% |
| | Silica/quartz | 16% |
| | Sodium/potassium feldspars | 79% |
| D) | Clay | 30% |
| | Quartz | 15% |
| | Feldspars | 55% |

In the experimental tests carried out with above indicated compositions it has been found that particularly with granulates having the composition C a product is obtained characterized by a high degree of surface transparence, and that the composition B gives to the matrix transparence and permits vertical volume variations.

It is lastly to be observed that in the above description reference has been made to preferred embodiments, but modifications and changes conceptually equivalent are possible and foreseable without falling out of the scope of the invention.

Particularly it is possible and foreseen the use of all the materials employed in the conventional manufacturing of ceramic materials and particularly of the several additives and manufacturing aids contemplated by this technology. Possible and foreseable as well is the admixing starting from materials which have no counterpart in the materials naturally existing and of ceramic materials of various compositions and colours which are suitably ground with the self evident advantages from the point of view aesthetical and/or of balancing the peculiar properties of each component.

I claim:

1. A process for manufacturing plates of ceramic material starting from natural stone material of natural origin having a flexural strength higher than 300 kg/sq.cm. or from a granulation of a ceramic material, the following steps:
    (a) preparation of a ceramic mixture comprising a binding phase and a granulate having particles of maximum size consistent with a thickness of a final compacted plate, said granulate being obtained from natural stone materials having a widely variable granule size and selected from the group consisting of feldspars, porphyry, granites and quartz materials, or from a granulation of ceramic materials, and said binding phase consisting of powders of ceramic materials moistened with a moistening agent and mixed with an inorganic water based binder, the ratio between granulate and binding phase being between 0.35 and 0.55 by volume, and the maximum size of the granules being less than ⅓ of the thickness of the final compacted plate or tile, and said moistening agent being sodium silicate in an aqueous solution and/or another refractory binder in an aqueous solution;
    (b) molding into a form of a plate in the form of a tile of the mixture thus prepared in step (a) and distributing or compacting the mixture onto a molding support, by a simultaneous application of a vibration action and of a pressing action onto the distributed mixture, the pressure being at least 0.5 kg/sq. cm., and subjecting the mixture throughout the molding to a vacuum of at least 40 mbar of residual pressure;
    (c) drying the molded product at a temperature lower than that of ceramic firing and for a time period of at least two hours; and
    (d) firing of the molded and dried product at a temperature of between 1000° C. and 1300° C. for the time necessary to obtain a plate of ceramic material having the properties characteristic of these materials.

2. The process according to claim 1, including subjecting said starting granulate to a preliminary calcination thermal treatment to obtain stable powders in the firing step.

3. The process according to claim 1, wherein the preparation of the starting mixture by admixing granulate, ceramic powder and moistening agent is carried out in a mixer maintained under vacuum.

4. The process according to claim 1, wherein said molding during step (b) of said mixture is distributed into a containing mold or onto a belt provided with a containing frame and abutting onto a supporting metal plane.

5. The process according to claim 1, wherein in said molding step said simultaneous application of vibration and of compacting pressure has a duration of about 40 seconds, the molding step taking place under vacuum.

6. The process according to claim 1, wherein said drying step is carried out at a temperature of 130° C.

7. The process according to claim 1, including carrying out the heating to the firing temperature gradually after the firing.

8. A process for manufacturing plates of ceramic material starting from natural stone material of natural origin having a flexural strength higher than 300 kg/sq.cm. or from ceramic material included by firing within ceramic matrices, comprising the following steps:
- a) preparation of a ceramic mixture comprising a binding phase and a granulate having particles of maximum size consistent with a thickness of a final compacted plate, said granulate being obtained from natural stone materials having a widely variable granule size selected from the group consisting of feldspars, porphyry, granites, syenites and quartz materials or from granulated ceramic materials, or both and said binding phase consisting of powders of ceramic materials moistened and mixed with an inorganic water based binder, the ratio between granulate and binding phase being between 0.35 and 0.55 by volume, and the maximum size of the granules being less than ⅓ of the thickness of the compacted plate;
- (b) molding into a form of a plate of the mixture thus prepared in step (a) and distributing the mixture onto a molding support, by a simultaneous application of a vibration action and of a pressing action onto the distributed mixture, the pressure being at least 0.5 kg/sq.cm., and subjecting the mixture throughout the molding to a vacuum of at least 40 mbar of residual pressure;
- (c) drying the molded product at a temperature lower than that of ceramic firing and for a time period of at least two hours; and
- (d) firing of the molded and dried product at a temperature of between 1000° C. and 1300° C. for the time necessary to obtain a plate of ceramic material having the properties characteristic of these materials.

9. The process according to claim 8, wherein said moistening agent is sodium silicate in an aqueous solution in a small amount to provide only a slight moistening of the granules and of the ceramic powder.

10. The process according to claim 8, wherein said moistening agent is a refractory binder in an aqueous solution.

11. The process according to claim 8, wherein during the firing step the shrinkage takes place mainly in a vertical direction relative to the plate to render the shrinkage to a minimum in a horizontal direction.

12. The process according to claim 11, including carrying out the heating to the firing temperature gradually after the firing.

13. The process according to claim 8, wherein said molding during step (b) of said mixture is distributed into a containing mold.

14. The process according to claim 8, wherein during said molding step the mixture is placed onto a belt provided with a containing frame and abutting onto a supporting metal plane.

15. The process according to claim 8, wherein the preparation of the starting mixture by admixing granulate, ceramic powder and moistening agent is carried out in a mixer maintained under vacuum.

16. The process according to claim 9, wherein during the firing step the shrinkage takes place mainly in a vertical direction relative to the plate to render the shrinkage to a minimum in a horizontal direction.

17. The process according to claim 10, wherein during the firing step the shrinkage takes place mainly in a vertical direction relative to the plate to render the shrinkage to a minimum in a horizontal direction.

18. The process according to claim 17, including carrying out the heating to the firing temperature gradually after the firing.

* * * * *